United States Patent
Jung et al.

(10) Patent No.: US 9,411,376 B2
(45) Date of Patent: Aug. 9, 2016

(54) DISPLAY MODULE INCLUDING FLEXIBLE PANEL

(71) Applicant: SAMSUNG DISPLAY CO., LTD., Yongin, Gyeonggi-Do (KR)

(72) Inventors: Tae-Hyeog Jung, Yongin (KR); Tae-Hoon Yang, Yongin (KR); Ki-Yong Lee, Yongin (KR); Sang-Wol Lee, Yongin (KR)

(73) Assignee: SAMSUNG DISPLAY CO., LTD., Yongin, Gyeonggi-do (KR)

(*) Notice: Subject to any disclaimer, the term of this patent is extended or adjusted under 35 U.S.C. 154(b) by 0 days.

(21) Appl. No.: 14/305,613

(22) Filed: Jun. 16, 2014

(65) Prior Publication Data
US 2015/0234431 A1    Aug. 20, 2015

(30) Foreign Application Priority Data
Feb. 14, 2014    (KR) .................. 10-2014-0017514

(51) Int. Cl.
| G02F 1/1335 | (2006.01) |
| G06F 1/16 | (2006.01) |
| G09G 5/00 | (2006.01) |
| G02F 1/1333 | (2006.01) |

(52) U.S. Cl.
CPC ............ *G06F 1/1652* (2013.01); *G06F 1/1601* (2013.01); *G06F 1/1613* (2013.01); *G06F 1/1643* (2013.01); *G09G 5/00* (2013.01); *G02F 1/133305* (2013.01); *G02F 2001/133314* (2013.01)

(58) Field of Classification Search
None
See application file for complete search history.

(56) References Cited

U.S. PATENT DOCUMENTS

| 2010/0073593 A1* | 3/2010 | Sasaki ............... B29D 11/00 349/58 |
| 2011/0050657 A1 | 3/2011 | Yamada |
| 2013/0002133 A1 | 1/2013 | Jin et al. |
| 2013/0002583 A1 | 1/2013 | Jin et al. |
| 2013/0241855 A1 | 9/2013 | Kim |
| 2015/0043180 A1 | 2/2015 | Lee |
| 2015/0173212 A1 | 6/2015 | Lee et al. |

FOREIGN PATENT DOCUMENTS

| JP | 2011-47976 | 3/2011 |
| KR | 10-2013-0004085 | 1/2013 |
| KR | 10-2013-0007311 | 1/2013 |
| KR | 10-2013-0104300 | 9/2013 |
| KR | 10-2015-0017273 A | 2/2015 |
| KR | 10-2015-0071415 A | 6/2015 |

* cited by examiner

*Primary Examiner* — Richard Kim
(74) *Attorney, Agent, or Firm* — Lee & Morse, P.C.

(57) ABSTRACT

A display module may include a flexible panel that is bent in a direction such that a compressive stress is exerted on a display unit within a housing.

12 Claims, 5 Drawing Sheets

DISPLAY MODULE INCLUDING FLEXIBLE PANEL

CROSS-REFERENCE TO RELATED APPLICATION

Korean Patent Application No. 10-2014-0017514, filed on Feb. 14, 2014, in the Korean Intellectual Property Office, and entitled: "Display Module Including Flexible Panel," is incorporated by reference herein in its entirety.

BACKGROUND

1. Field

Embodiments relate to a display module including a flexible panel.

2. Description of the Related Art

In general, a flexible panel may include a display unit on a flexible substrate and may be pliable and deformed as needed.

SUMMARY

Exemplary embodiments include a display module including a flexible panel.

A display module may include a flexible panel including a display unit on a flexible substrate, and a housing accommodating the flexible panel. The flexible panel may be bent in a direction such that a compressive stress is exerted on the display unit within the housing.

The housing may include a window that covers a side of the flexible panel on which an image is displayable, and a case that covers other sides of the flexible panel.

A touch screen panel may be between the flexible panel and the window, and the touch screen panel may include a wiring layer for performing a touch manipulation.

The touch screen panel may be bent in a direction such that a compressive stress is exerted on the wiring layer within the housing.

The display module may further include a transparent dummy film between the touch screen panel and the window. A transparent dummy film may be between the touch screen panel and the flexible panel.

The display module may further include a polarization film between the flexible panel and the touch screen panel, and a polarization film may be between the touch screen panel and the window. The display module may further include a polarization film between the flexible panel and the window. The polarization film may include a phase difference film layer, and the touch screen panel may be on the phase difference film layer.

A phase difference film layer may be on a surface of the flexible panel opposite to the window.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
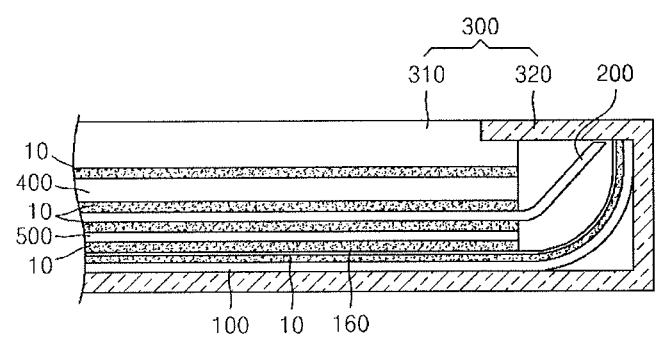
FIG. 1 illustrates a sectional view of a display module according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" or "formed on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the singular forms "a," "an" and "the" are intended to include the plural forms as well, unless the context clearly indicates otherwise.

It will be further understood that the terms "comprises" and/or "comprising," and "includes" and/or "including" used herein specify the presence of stated features or components, but do not preclude the presence or addition of one or more other features or components.

When a certain embodiment may be implemented differently, a specific process order may be performed differently from the described order. For example, two consecutively described processes may be performed substantially at the same time or performed in an order opposite to the described order.

FIG. 1 illustrates a sectional view of a display module according to an exemplary embodiment.

Referring to FIG. 1, the display module may be a stack of a flexible panel 100 having pliability, a polarization film 500, a touch screen panel 200, and dummy films 160 and 400 with pressure sensitive adhesives (PSAs) 10 interposed therebetween. The stack may be received and protected by a housing 300 including a window 310 and a case 320. The window 310 may cover an upper side of the flexible display panel 100 on which an image is displayed, and the case 320 may cover the other sides.

Figure 2A:
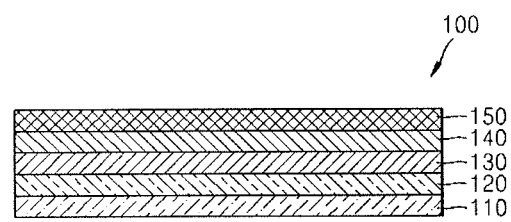
FIG. 2A illustrates a sectional view of a structure of a flexible panel in the display module of FIG. 1.

As illustrated in FIG. 2A, the flexible panel 100 is may be obtained by forming, on a flexible substrate 130 having pliability, a display unit 140 for image display and a thin film encapsulation layer 150 covering the display unit 140 to protect the display unit 140. Because the flexible panel 100 includes the flexible substrate 130 having pliability, the flexible panel 100 may be freely bent within an allowable range of the pliability. Reference numeral 110 indicates a protective film that may be attached to a bottom surface of the flexible substrate 130 with a PSA 120 interposed therebetween. As shown in FIG. 2A, the display unit 140, which is a main part of the flexible panel 100 that displays an image, may be located in an upper portion of the body of the flexible panel 100. Thus, if the flexible panel 100 is bent downward, a tensile stress may be applied to the display unit 140. When a tensile stress is applied to the display unit 140, various metal lines, an emission layer, and the like included in the display unit 140 may become cracked. A detailed structure of the display unit 140 will be described later. In the present embodiment illustrated in FIG. 1, a compressive stress may be applied to the display unit 140 by bending an end of the flexible panel 100 upward, namely, toward the window 310.

When a tensile stress is applied to the display unit 140 so that both ends of the display unit 140 are pulled apart from each other, the display unit 140 may become cracked. However, cracking may be reduced or prevented when the display unit 140 is under a compressive stress such that the display unit 140 is compressed inward. In other words, by maintaining the display unit 140 under a compressive stress, the formation of cracks in display unit 140 may be reduced or prevented. Thus, the flexible panel 100 may be bent in a direction where a compressive stress is exerted on the display unit 140. Accordingly, inoperability of the display unit 140 due to cracks may be effectively reduced or prevented.

Figure 2B:
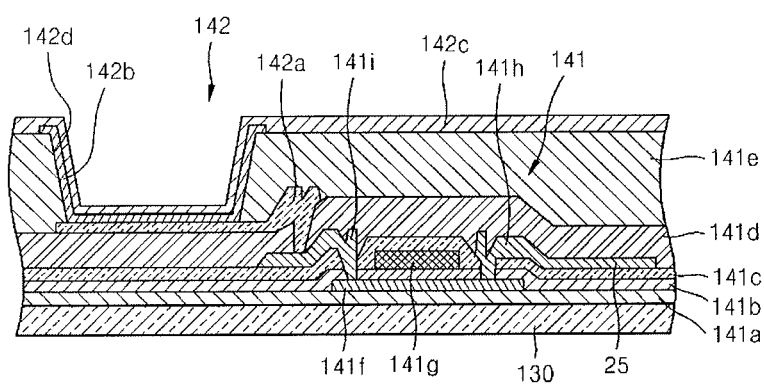
FIG. 2B illustrates a magnified view of a display unit included in the flexible panel of FIG. 2A.

The detailed structure of the display unit 140 is illustrated in FIG. 2B. As illustrated in FIG. 2B, the display unit 140 may include a thin film transistor (TFT) 141, an organic light emitting diode (OLED) 142, or the like. In more detail, a semiconductor active layer 141f may be formed on an upper surface of a buffer layer 141a on the flexible substrate 130, and may have a source region and a drain region both doped with N-type or P-type impurities at a high concentration. The semiconductor active layer 141f may be formed of an oxide semiconductor. For example, the oxide semiconductor may include an oxide of a Group 12, 13, or 14 metal element, such as zinc (Zn), indium (In), gallium (Ga), stannum (Sn), cadmium (Cd), germanium (Ge), or a combination thereof For example, the semiconductor active layer 141f may include G-I—Z—O [$(In_2O_3)a(Ga_2O_3)b(ZnO)c$], wherein a, b, and c are natural numbers that respectively satisfy a≥0, b≥0, and c>0. A gate electrode 141g may be formed on the semiconductor active layer 141f with a gate insulating layer 141b interposed therebetween. A source electrode 141h and a drain electrode 141i may be formed on the gate electrode 141g. An interlayer insulation layer 141c may be provided between the gate electrode 141g and the source electrode 141h and between the gate electrode 141g and the drain electrode 141i. A passivation layer 141d may be interposed between the source electrode 141h, the drain electrode 141i, and an anode electrode 142a of the OLED 142.

An insulative planarization layer 141e including acryl or the like may be formed on the anode electrode 142a, and an aperture 142d may be formed in the insulative planarization layer 141e.

The OLED 142 may display image information by emitting red, green and blue light as current flows. The OLED 142 may include the anode electrode 142a, which may be connected to the drain electrode 141i of the TFT 141 and thus may receive a positive power voltage from the drain electrode 141i. The OLED 142 may further include a cathode electrode 142c, which may be formed to cover the entire pixel and to which a negative power voltage is applied, and an emission layer 142b, which may be disposed between the anode electrode 142a, and the cathode electrode 142c to emit light.

A hole injection layer (HIL), a hole transport layer (HTL), an electron transport layer (ETL), an electron injection layer (EIL), or the like may be stacked adjacent to the emission layer 142b.

The emission layer 142b may be separately formed on each pixel so that pixels that emit red, green, and blue light beams constitute a unit pixel. Alternatively, an emission layer may be formed to cover the entire pixel area, regardless of the locations of pixels. In exemplary embodiments, the emission layer may be formed by vertically stacking layers including light-emission materials that emit red light, green light, and blue light or by mixing these layers. Of course, combinations of other colors may also be possible provided that white light may be emitted. A color converting layer or a color filter that coverts the white light into a light of a predetermined color may also be included.

Because the emission layer 142b may be vulnerable to moisture, light-emission performance thereof may be degraded when moisture is introduced into the display unit 140.

Thus, the thin film encapsulation layer 150, in which an organic film and an inorganic film are alternately stack on one another, may cover and protect the display unit 140.

Figure 3:
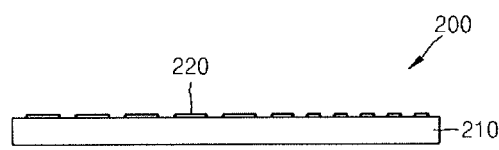
FIG. 3 illustrates a sectional view of a structure of a touch screen panel in the display module of FIG. 1.

The touch screen panel 200, which may be coupled to control an image display of the display unit 140 via a touch manipulation, may have a structure as illustrated in FIG. 3.

Referring to FIG. 3, a wiring layer 220 including a conductive material such as ITO, may be formed on a flexible substrate 210. The flexible substrate may include polyethylene terephthalate (PET), which is a flexible soft film. Because the wiring layer 220 may be located in an upper portion of the body of the touch screen panel 200, when the wiring layer 220 is bent downward, a tensile stress may be exerted on the wiring layer 220, and thus the wiring layer 220 may be cracked. Thus, according to exemplary embodiments, the touch screen panel 200 may also be bent upward, namely, in a direction where a tensile stress is exerted on the wiring layer 220, as with the flexible panel 100. Accordingly, touch manipulation failures due to the cracking of the wiring layer 220 may be reduced or prevented.

Accordingly, in display modules of exemplary embodiments, cracking of the display unit 140 of the flexible panel 100 or the wiring layer 220 of the touch screen panel 200 and disconnection of wires may be reduced or prevented. As a result, a failure rate of products may be greatly reduced.

In the above-described embodiment of FIG. 1, the stacked structure including in order, the flexible panel 100, the polarization film 500, the touch screen panel 200, and the dummy film 400 is illustrated; however, the stacking order may vary.

Figure 4:
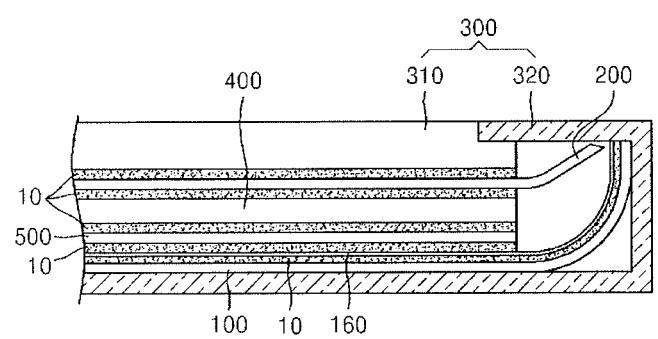
FIGS. 4 through 8 illustrate sectional views of modifications of the display module of FIG. 1.

In other words, although the dummy film 400, which may be transparent, may be located between the touch screen panel 200 and the window 310 in FIG. 1, the dummy film 400 may alternatively be located between the flexible panel 100 and the touch screen panel 200, as illustrated in FIG. 4. In this case, respective ends of the flexible panel 100 and the touch screen panel 200 may also be bent in a direction where a tensile stress is exerted on the display unit 140 and the wiring layer 220. The tensile stress may be a compressive stress.

Figure 5:
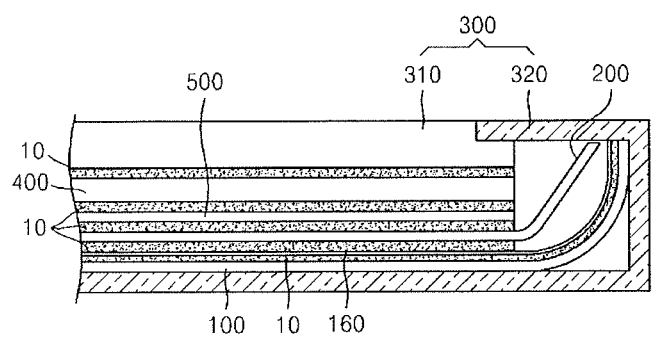
Figure 6:
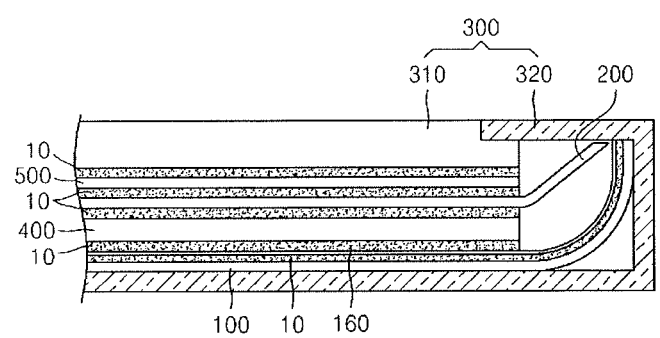

In addition, although the polarization film 500 may be located between the flexible panel 100 and the touch screen panel 200 in FIG. 1, the polarization film 500 may alternatively be located between the touch screen panel 200 and the window 310, as illustrated in FIG. 5 or 6.

Figure 7:
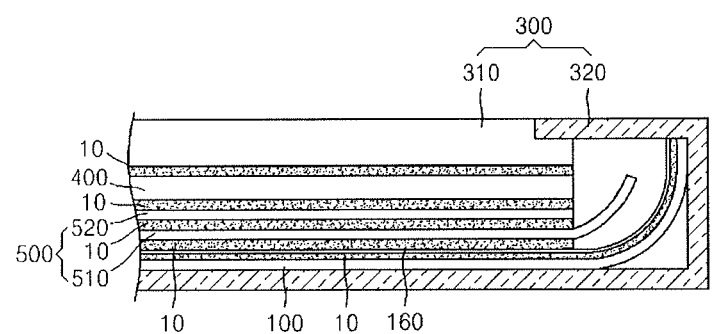

An alternative embodiment that is similar to FIG. 1 is shown in FIG. 7. As shown in FIG. 7, the polarization film 500 may include a typical polarization layer 520, a phase difference film layer 510. A touch screen panel may be integrally formed with the phase difference film layer 510. In other words, unlike the touch screen panel 200 that may be formed as a separate layer as shown in FIG. 1, the touch screen panel 200 of FIG. 7 may be integrally formed into the phase difference film layer 510 of the polarization film 500. In this case, respective ends of the flexible panel 100 and the touch screen panel 200 may be bent in a direction where a tensile stress is exerted on the display unit 140 and the wiring layer 220. In FIG. 7, the phase difference film layer 510 may be bent upward on when a wiring layer is in an upper portion of the phase difference film layer 510. However, if a wiring layer is in a lower portion of the phase difference film layer 510, the phase difference film layer 510 may be bent downward.

Figure 8:
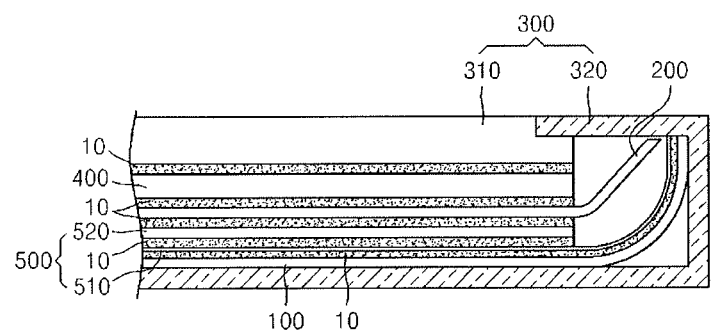

In FIG. 1, the dummy film 160 may be attached to a surface of the flexible panel 100 opposite to the window 310. However, as illustrated in FIG. 8, the phase difference film layer 510 of the polarization film 500 may be formed on the surface of the flexible panel 100 opposite to the window 310.

By way of summation and review, a flexible display panel including a display unit on a flexible substrate may be pliable and deformed as needed. However, the flexible panel may include a display unit for displaying an image and the display unit may become cracked when bent.

In contrast, in exemplary embodiments, cracking of a display unit and a wiring layer may be effectively reduced or prevented, and thus the possible disconnection of wires may be greatly reduced.

According to exemplary embodiments the stacked structure of FIG. 1 may be variously changed. However, in all cases, the flexible panel 100 and the touch screen panel 200 are bent in a direction where a tensile stress is exerted on the display unit 140 and the wiring layer 220. As a result, cracking of the display unit 140 and the wiring layer 220 may be effectively reduced or prevented.

As the risk of cracking decreases, a flexible panel and a touch screen panel may be greatly bent at a relatively small curvature within a housing, and a non-display region outside a window may be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display module comprising:
   a flexible panel including a display unit on a flexible substrate; and
   a housing accommodating the flexible panel,
   the flexible panel being maintained under compressive stress exerted on the display unit within the housing to bend only a non-display region of the flexible panel.

2. The display module as claimed in claim 1, wherein the housing includes:
   a window that covers a side of the flexible panel on which an image is displayable, the window not covering the non-display region; and
   a case that covers other sides of the flexible panel.

3. The display module as claimed in claim 2, further comprising a touch screen panel between the flexible panel and the window,
   wherein the touch screen panel includes a wiring layer for performing a touch manipulation.

4. The display module as claimed in claim 3, wherein the touch screen panel is bent such that compressive stress is exerted on the wiring layer within the housing.

5. The display module as claimed in claim 4, further comprising a transparent dummy film between the touch screen panel and the window.

6. The display module as claimed in claim 4, further comprising a transparent dummy film between the touch screen panel and the flexible panel.

7. The display module as claimed in claim 4, further comprising a polarization film between the flexible panel and the touch screen panel.

8. The display module as claimed in claim 4, further comprising a polarization film between the touch screen panel and the window.

9. The display module as claimed in claim 4, further comprising a polarization film between the flexible panel and the window,
   wherein:
      the polarization film includes a phase difference film layer, and
      the touch screen panel is on the phase difference film layer.

10. The display module as claimed in claim 4, further comprising a phase difference film layer on a surface of the flexible panel opposite to the window.

11. The display module as claimed in claim 1, wherein only non-display region ends of the flexible panel are bent upwardly under the compressive stress.

12. A display module comprising:
    a flexible panel including a display unit on a flexible substrate; and
    a housing accommodating the flexible panel, the housing including:
       a window that covers a side of the flexible panel on which an image is displayable; and
       a case that covers at least one other side of the flexible panel;
    the flexible panel being bent such that only non-display region ends of the flexible panel not covered by the window extend toward the window.

* * * * *